United States Patent
Li et al.

(10) Patent No.: US 9,648,211 B2
(45) Date of Patent: May 9, 2017

(54) AUTOMATIC VIDEO SYNCHRONIZATION VIA ANALYSIS IN THE SPATIOTEMPORAL DOMAIN

(71) Applicant: Xerox Corporation, Norwalk, CT (US)

(72) Inventors: Qun Li, Webster, NY (US); Edgar A. Bernal, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/712,263

(22) Filed: May 14, 2015

(65) Prior Publication Data

US 2016/0337555 A1 Nov. 17, 2016

(51) Int. Cl.
| | |
|---|---|
| G06K 9/00 | (2006.01) |
| H04N 5/04 | (2006.01) |
| H04N 5/247 | (2006.01) |
| H04N 5/232 | (2006.01) |

(52) U.S. Cl.
CPC ........... *H04N 5/04* (2013.01); *H04N 5/23229* (2013.01); *H04N 5/247* (2013.01)

(58) Field of Classification Search
CPC .... G06T 7/0024; H04N 5/04; H04N 5/23229; H04N 5/247
See application file for complete search history.

(56) References Cited

U.S. PATENT DOCUMENTS

| | | |
|---|---|---|
| 4,670,786 A | 6/1987 | Ricciardi |
| 5,294,981 A | 3/1994 | Yazolino et al. |
| 6,320,624 B1 | 11/2001 | Ayer et al. |
| 6,340,991 B1 | 1/2002 | Chen et al. |
| 7,221,794 B1 | 5/2007 | Gloudemans, II et al. |
| 7,598,977 B2 | 10/2009 | Ryall et al. |
| 8,405,763 B2 | 3/2013 | Veeraraghavan et al. |
| 8,571,261 B2 | 10/2013 | Gagvani et al. |
| 8,620,077 B1 | 12/2013 | Grundmann et al. |
| 8,665,320 B2 | 3/2014 | Holley |
| 8,699,566 B2 | 4/2014 | Ananthanarayanan et al. |
| 8,764,555 B2 | 7/2014 | Quan et al. |
| 8,782,176 B2 | 7/2014 | Zohar et al. |
| 2002/0094135 A1* | 7/2002 | Caspi .................. G06T 7/20 382/294 |
| 2006/0115116 A1* | 6/2006 | Iwasaki .............. G06K 9/00348 382/103 |

(Continued)

OTHER PUBLICATIONS

Ledesma-Carbayo et al, "Spatio-Temporal Nonrigid Registration for Ultrasound Cardiac Motion Estimation", 2005, IEEE Transactions on Medical Imaging, vol. 24, No. 9, pp. 1113-1126.*

(Continued)

*Primary Examiner* — David F Dunphy
(74) *Attorney, Agent, or Firm* — Kermit D. Lopez; Luis M. Ortiz; Ortiz & Lopez, PLLC (57) ABSTRACT

Methods and systems for automatically synchronizing videos acquired via two or more cameras with overlapping views in a multi-camera network. Reference lines within an overlapping field of view of the two (or more) cameras in the multi-camera network can be determined wherein the reference lines connect two or more pairs of corresponding points. Spatiotemporal maps of the reference lines can then be obtained. An optimal alignment between video segments obtained from the cameras is then determined based on the registration of the spatiotemporal maps.

20 Claims, 7 Drawing Sheets

(56) References Cited

U.S. PATENT DOCUMENTS

| | | |
|---|---|---|
| 2007/0107032 A1 | 5/2007 | Rachamadugu |
| 2010/0135395 A1 | 6/2010 | Servais et al. |
| 2011/0170744 A1* | 7/2011 | Malinovskiy ...... G06K 9/00785 382/103 |
| 2013/0039419 A1 | 2/2013 | Denoual et al. |

OTHER PUBLICATIONS

Pratt et al, "Dynamic Guidance for Robotic Surgery Using Image-Constrained Biomechanical Models", 2010, MICCAI, Part I, LNCS 6361, pp. 77-85.*
Wooden et al, "Autonomous Navigation for BigDog", 2010, IEEE International Conference on Robotics and Automation, pp. 4736-4741.*
Andrienko, N. et al., "Exploratory spatio-temporal visualization: an analytical review," Journal of Visual Languages and Computing (2003) 14:503-541.
Kaewtrakulpong, P. et al., "An Improved Adaptive Background Mixture Model for Real-time Tracking with Shadow Detection," Video-Based Surveillance Systems: Computer Vision and Distributed Processing II (2002) Springer, US, Kluwer Academic Publishers, pp. 135-144.
Stauffer, C. et al., "Adaptive background mixture models for real-time tracking," IEEE Computer Society Conference on Computer Vision and Pattern Recognition (1999) vol. 2, Jun. 23-25, Fort Collins, CO, 7 pages.

* cited by examiner

AUTOMATIC VIDEO SYNCHRONIZATION VIA ANALYSIS IN THE SPATIOTEMPORAL DOMAIN

TECHNICAL FIELD

Embodiments are generally related to video monitoring and camera networks. Embodiments are additionally related to video synchronization techniques for automatically synchronizing video feeds acquired with cameras with overlapping views.

BACKGROUND OF THE INVENTION

Large-scale, distributed, and heterogeneous camera networks have been widely deployed in support of video monitoring applications such as surveillance, traffic law enforcement, and environmental monitoring, among others. One major challenge associated with the use of such camera networks is figuring out how to make sense of the vast quantity of visual data they generate. In particular, one seminal problem yet to be resolved is the fusion/aggregation of information of the same object across multiple cameras in the spatiotemporal domain, a task that is generally referred to as the "object re-identification" (or camera handoff) problem. Performing re-identification is required in instances where there is a desire to track and/or identify objects (e.g., people, groups of people, vehicles, etc.) as they transition between cameras, at potentially different times and locations. A prerequisite of fusing the vast quantity of visual data generated by a multi-camera network is to temporally synchronize videos acquired by different cameras.

There are several factors that might cause the videos recorded by different cameras to be out-of-sync at different stages in the processes of video acquisition and processing. For instance, at the acquisition step, even with the use of multi-camera video management software that supports simultaneous recording from various cameras, different cameras may take slightly different amounts of time to start recording, causing videos to be out-of-sync from the beginning. Another example comes from inherent frame rate discrepancies: videos from different cameras might be recorded at different frame rates, or even if they are set to be recorded at a certain frame rate, the actual acquisition frame rate may differ slightly (e.g., up to +/−5 fps) from the desired frame rate, giving rise to inevitable sync issues.

Even if the videos are converted to a common frame rate, quantization errors associated with the mapping of the different frame rates to a unique frame rate may accumulate over time and sync issues can be introduced by the conversion process. Moreover, video cameras often record video on a short segment-by-segment basis (whose frame rate also turns to vary slightly from segment to segment), and the segments need to be converted and stitched together before analysis, causing out-of-sync issue to accumulate and worsen over time. In some cases, the videos that need to be synchronized have a largely different intended frame rate (e.g., one video may have a frame rate of 5 fps and the other video 30 fps), which also causes a problem for manual synchronization methods.

Currently, most of such synchronization tasks are performed manually by going through a large amount of videos and temporally localizing specific events (e.g., a vehicle driving from one camera's field of view into that of an adjacent camera) across multiple cameras to aid the synchronization. The manual synchronization approach becomes more and more unrealistic as the amount of video data generated by the camera network grows (e.g., because of the number of cameras in the network grows). Manual synchronization is labor-intensive and time-consuming; it is also error-prone and does not usually provide satisfactory accuracy for applications that rely on precise synchronization (e.g., object tracking/handoff/re-identification across cameras with and without overlapping fields of view) down to small fractions of a second (e.g., 1/30 second in 30 fps systems).

It is often the case that video streams from two cameras need to be re-synchronized frequently due to the cameras exhibiting different rates of deviation from an intended frame rate. As a result, more efficient and accurate synchronization methods are needed for automatically processing videos produced by camera networks.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an improved video synchronization method and system.

It is another aspect of the disclosed embodiments to provide for a method and system for automatically synchronizing videos acquired by at least two cameras (e.g., or pairs of cameras) with overlapping views in a multi-camera network.

It is another aspect of the disclosed embodiments to provide for a method and system for automatically synchronizing videos acquired by cameras with overlapping views in a multi-camera network via foreground detection in the spatiotemporal domain.

The aforementioned aspects and other objectives and advantages can now be achieved as described herein. Methods and systems are disclosed for automatically synchronizing videos acquired by two or more cameras with overlapping views in a multi-camera network. Reference lines within an overlapping field of view of the two (or more) cameras in the multi-camera network can be determined wherein the reference lines connect two or more pairs of corresponding points. Spatiotemporal maps of the reference lines can then be obtained. An optimal alignment between video segments obtained from the cameras can be determined based on a registration of the spatiotemporal maps.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

Reference will now be made in detail to the present embodiments (exemplary embodiments) of the invention, examples of which are illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the invention may be practiced. These embodiments are described in sufficient detail to enable those skilled in the art to practice the invention and it is to be understood that other embodiments may be utilized and that changes may be made without departing from the scope of the invention. The following description is, therefore, merely exemplary.

While the invention has been illustrated with respect to one or more implementations, alterations and/or modifications can be made to the illustrated examples without departing from the spirit and scope of the appended claims. In addition, while a particular feature of the invention may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising." The term "at least one of" is used to mean one or more of the listed items can be selected.

Figure 1A:
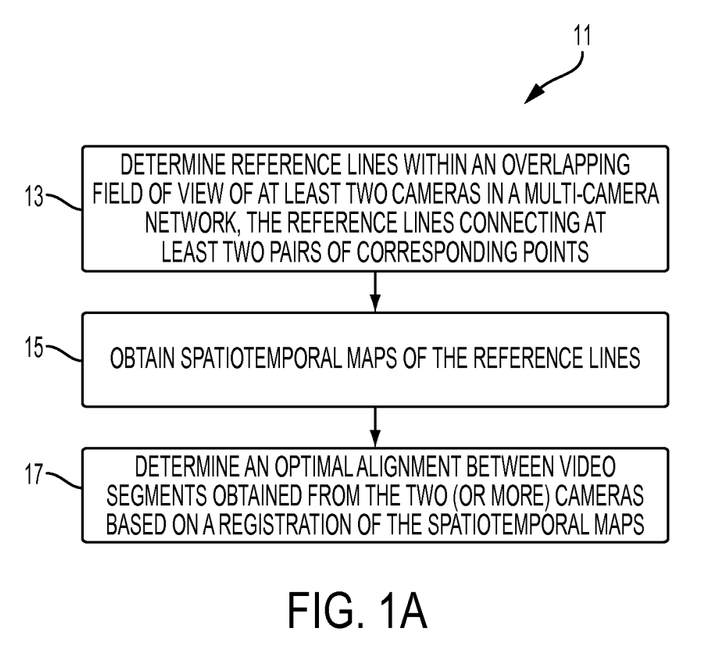
FIG. 1A illustrates a flow chart of operations of a method for automatically synchronizing videos acquired by at least two cameras with overlapping views in a multi-camera network, in accordance with one embodiment.

FIG. 1A illustrates a flow chart of operations of a method 11 for automatically synchronizing videos acquired by at least two cameras with overlapping views in a multi-camera network, in accordance with an alternative embodiment. Note that the methodology depicted in FIG. 1A does not require the use of a foreground mask detection operation such as required by the embodiment of method 10 of FIG. 1B. As shown at block 13, a step or operation can be provided for determining reference lines within an overlapping field of view of at least two cameras in a multi-camera network, the reference lines connecting at least two pairs of corresponding points. As depicted next at block 15, a step or operation can be implemented for obtaining spatiotemporal maps of the reference lines. Thereafter, as shown at block 17, a step or operation can be processed for determining an optimal alignment between video segments obtained from the two (or more) cameras based on a registration of the spatiotemporal maps.

The registration of the spatiotemporal maps can involve extracting features from the spatiotemporal maps and finding correspondences between the extracted features. Operations can also be provided for registering the spatiotemporal maps via, for example, an intensity-based registration technique and/or a feature-based registration technique. Registration of the spatiotemporal maps can also involve dynamic time warping. In some embodiments, the spatiotemporal maps can be registered by determining parameters of a geometric transformation that best maps one spatiotemporal map to another. The geometric transformation may involve, for example, rotation, scaling, translation, perspective, projective, and affine.

In one embodiment, the spatiotemporal maps are binary and obtaining the spatiotemporal maps involves performing background estimation with respect to the reference lines; and based on the background estimation and incoming frames, performing foreground detection on each of the reference lines across a period of time to obtain a binary spatiotemporal map. In some embodiments, registering the spatiotemporal maps can involve projecting the spatiotemporal maps along a spatial dimension to obtain temporal sequences, and registering the resulting temporal sequences via a one-dimensional signal registration technique. Additionally, the corresponding points that determine the reference lines can be automatically, manually or semi-automatically selected via feature extraction and matching between views among the two or more cameras. The two or more cameras also generally record videos at either the same or different frame rates, and there may be a temporal offset between the videos recorded by the cameras.

Figure 1B:
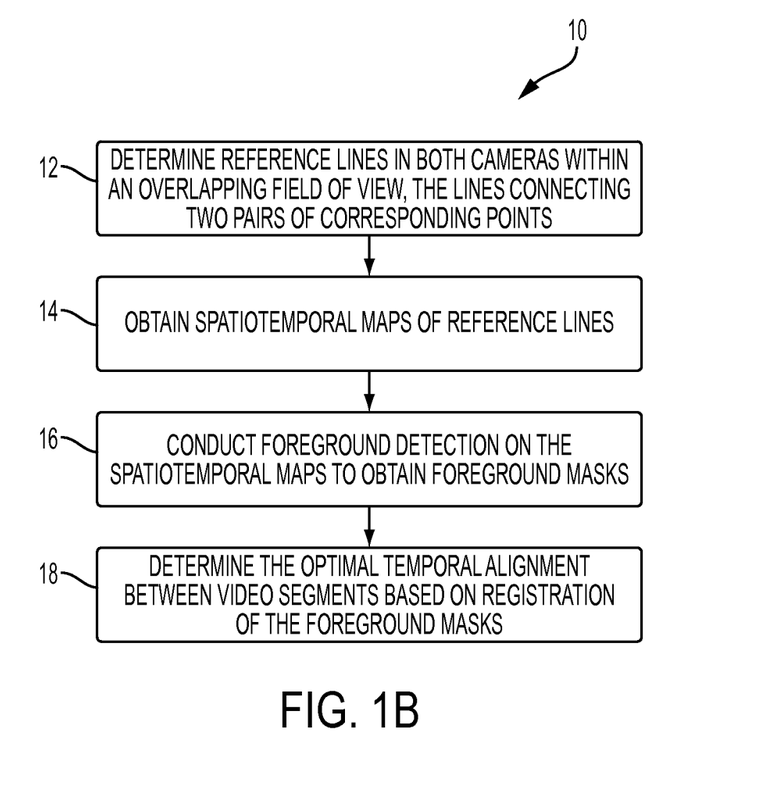
FIG. 1B illustrates a flow chart that depicts operational steps of a method for automatically synchronizing videos via foreground detection in the spatiotemporal domain, in accordance with another embodiment.

FIG. 1B illustrates a flow chart that depicts operational steps of a method 10 for automatically synchronizing videos via foreground detection in spatiotemporal domain, in accordance with one embodiment. As shown at block 12, a step or operation can be implemented to determine reference lines in both cameras within an overlapping field of view, the lines connecting two pairs of corresponding points. Thereafter, as depicted at block 14, a step or operation can be implemented to obtain spatiotemporal maps of reference lines.

Then, as illustrated at block 16, a step or operation can be processed to conduct foreground detection on the spatiotemporal maps to obtain foreground masks. Finally, as indicated at block 18, a step or operation can be provided to determine the optimal temporal alignment between video segments based on registration of the foreground masks. It can be appreciated that the methodology shown in FIG. 1B represents one embodiment for automatically synchronizing videos. Variations to this methodology can be implemented in the context of other embodiments.

It can be appreciated that without loss of generality, the disclosed approach can be described in the context of an exemplary case wherein videos recorded by two cameras with overlapping fields of view need to be synchronized. It is straightforward to extend the disclosed embodiments to synchronize multiple cameras with pairwise overlapping fields of view. It can be appreciated that the disclosed embodiments are not limited to the use of two cameras, but various embodiments can implement more than two cameras (e.g., three, four cameras, etc.).

Thus, the operation illustrated at block 12 of FIG. 1B, for example, involves determining reference lines in both cameras within the overlapping field of view, the lines connecting two pairs of corresponding points. Reference lines that lie within the overlapping field of view between the two cameras are first determined. In another embodiment, the reference lines can be determined by selecting two anchor points (e.g., the starting point and the end point) on the line, which can be easily identified and used to ensure correspondence across both cameras. This process can be performed manually at camera installation, or automatically by establishing feature correspondences between the two camera views and finding the line segment that connects the two sets of points whose matching confidence is highest at an area of the image where some degree of motion is to be expected.

Figure 2:
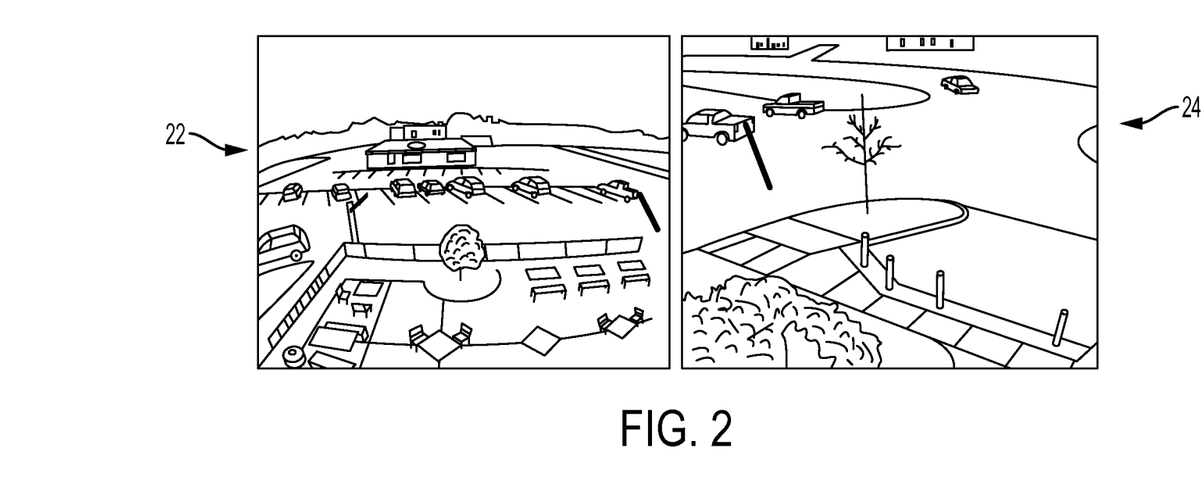
FIG. 2 illustrates an example of selected reference lines in two adjacent cameras, in accordance with an example embodiment.

FIG. 2 depicts an example of selected reference lines in two adjacent camera views 22, 24, in accordance with an example embodiment. Note that the depicted reference lines shown in FIG. 2 are straight for illustrative purposes; more generally, the reference lines can have any arbitrary shape and length as long as for every point in the reference line of one camera, there is a corresponding point in the reference line of the other camera. In order to write out the spatiotemporal map of the reference line, image coordinates of the pixels along the reference line need to be specified. Let $S_1=(x_1,y_1)$ and $S_2=(x_2,y_2)$ denote the starting and end point of the reference line in one camera respectively, where $(x_i, y_i)$ are the image coordinates of the point, for i=1, 2. Then, the equation describing the coordinates of points in the reference line can be expressed as follows:

$$y - y_1 = \frac{y_2 - y_1}{x_2 - x_1}(x - x_1)$$

Next, for each integer coordinate $x_k$ between $x_1$ and $x_2$ (i.e., assume $x_1 \leq x_2$ and $y_1 \leq y_2$ for simplicity and without loss of generality), find the corresponding $$y_k = y_1 + \frac{y_2 - y_1}{x_2 - x_1}(x_k - x_1).$$

Therefore, the set of pixels along the reference line are as follows $$\left(x_k, y_1 + \frac{y_2 - y_1}{x_2 - x_1}(x_k - x_1)\right),$$

where $x_1 \leq x_k \leq x_2$. Depending on the requirement of resolution, a different (e.g., possibly larger) number of pixels that intersect with the reference line can be selected. For instance, in the case where $y_2 - y_1 \geq x_2 - x_1$, the set of selected points can be summarized as $$\left(x_1 + \frac{x_2 - x_1}{y_2 - y_1}(y_k - y_1)y_k\right)$$

where $y_1 \leq y_k \leq y_2$.

As discussed previously, block 14 in FIG. 1B describes an example operation for obtaining spatiotemporal maps of reference lines. Spatiotemporal maps provide a method for visualizing a temporally evolving and spatially varying field. A spatiotemporal map of the reference line in one camera can be viewed as an m×n×k tensor, where m represents the number of pixels on the reference line in the camera, n represents the number of frames analyzed, and k represents the number of color channels for each pixel. For instance, k=1 for a grayscale image and k=3 for an RGB image. For all pixel locations along the reference line in each camera, the pixel values at each frame t will be recorded and stacked to form a column of the spatiotemporal map.

Figure 3A:
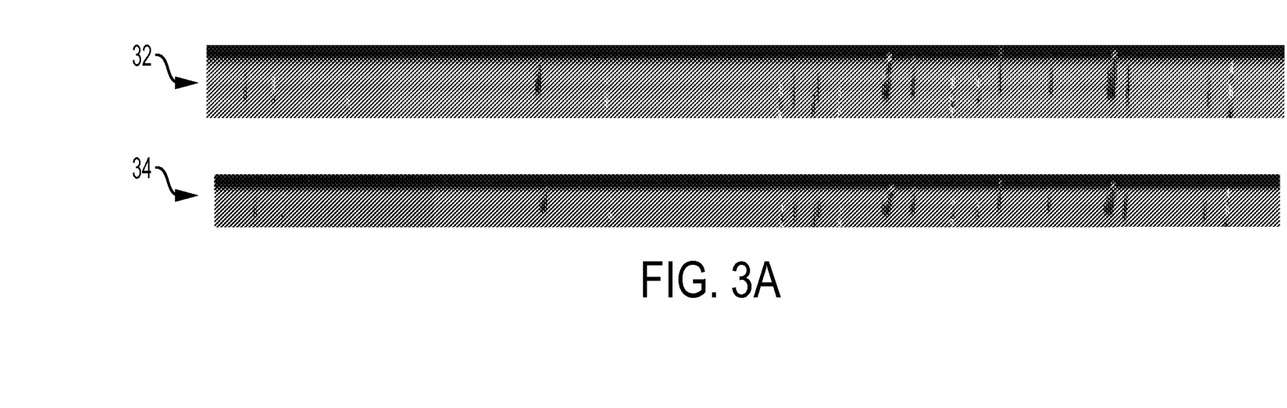
FIG. 3A illustrates samples of spatiotemporal maps of the reference line in two camera views, in accordance with an example embodiment.

FIG. 3A illustrates samples of spatiotemporal maps 32, 34 of the reference line in two camera views, in accordance with an example embodiment. In the top graphic of FIG. 3A, a spatiotemporal map 32 of the reference line in camera 1 is shown. In the bottom graphic of FIG. 3A, a spatiotemporal map 34 of the reference line in camera 2 is depicted. When the numbers of pixels corresponding to the reference line are different and they need to be compared (e.g., registered, correlated, etc.), the spatiotemporal maps can be resized along the spatial dimension for more accurate correspondence computation.

Figure 3B:
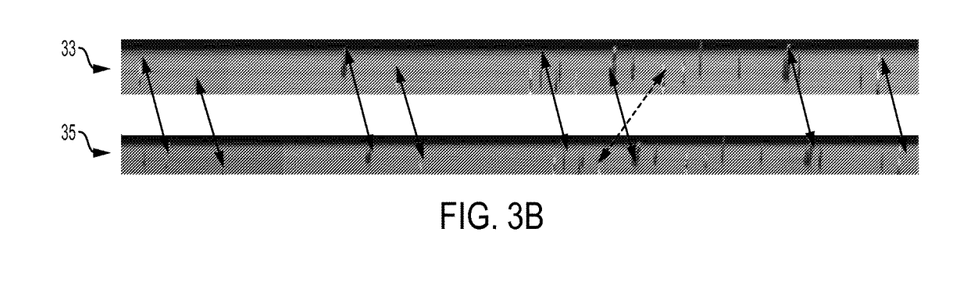
FIG. 3B illustrates an example wherein features from each of the spatiotemporal maps and extracted and correspondences are found or determined across extracted features, in accordance with an example embodiment.

FIG. 3B illustrates an example wherein features from each of the spatiotemporal maps are extracted and correspondences are found or determined between extracted features, in accordance with an example embodiment. Note that block 17 in FIG. 1A, for example, describes an operation wherein registration of spatiotemporal maps is performed. This can be achieved, for example, by extracting features from each of the spatiotemporal maps and finding correspondences across extracted features, as illustrated by the marked-up spatiotemporal maps 33, 35 shown in FIG. 3B. Features that can be used to establish correspondences include edges, Harris Corners, Scale Invariant Feature Transform (SIFT) features, Maximally Stable External Regions (MSER) features, Speeded Up Robust Features (SURF), among others.

Once correspondences are established, the parameters of the geometric transformation describing the relationship between the two spatiotemporal maps and as determined by the correspondences can be established. This can be achieved, for example, via regression methods. Note that the correspondence problem is not fail-proof, and correspondences between points that represent different objects and instants in time in the maps can sometimes be established (see dotted arrow, which, in contrast to continuous arrows, indicates an incorrect feature correspondence). Consequently, it is desirable that the process whereby the parameters of the geometric transformation are estimated be robust to noise and outliers. One such method is the Random Sample Consensus (RANSAC) iterative procedure.

Specifically, let [m, n] and [p, q] denote the coordinate systems of each of the pixels in the first and second spatiotemporal maps, respectively. Let n and q denote the temporal axes of each of the maps. In one embodiment, registration of the spatiotemporal maps can be achieved by finding a geometric transformation $T_0$ that maps one system to the other, namely [m, n]=$T_0\{$[p, q]$\}$. In an alternative embodiment, and since only temporal registration is required to synchronize the cameras, finding the geometric transformation $T_1$ that maps one temporal coordinate system to the other may suffice. In other words, n=$T_1\{q\}$. Specifically, in the case where the reference lines are straight but have different lengths and the video feeds have the same frame rate but have a fixed temporal offset, [m, n]=[kp, q+$\alpha$], where k denotes the length ratio between the lengths of the reference lines and $\alpha$ denotes the temporal offset between the video feeds. In such case, a majority of corresponding points will have coordinates [$m_0$, $n_0$], [$m_1$, $n_1$], . . . , [$m_c$, $n_c$] and [$p_0$, $q_0$], [$p_1$, $q_1$], . . . , [$p_c$, $q_c$] satisfying [$m_i$, $n_i$]=[$(k+\epsilon_k)p_i$, $q_i+(\alpha+\epsilon_q)$] where $\epsilon_k$ and $\epsilon_q$ are small constants that reflect the impact of spatial quantization errors and noise on the corresponding problem.

In one embodiment, if the lengths of the reference lines (in pixels) are known, the parameter k can be estimated from their ratio. In another embodiment, the parameter k is estimated in the geometric transformation parameter estimation stage. In either of these embodiments, the temporal offset $\alpha$ is estimated in the geometric transformation parameter estimation stage. In the case where the reference lines are straight but have different lengths and the video feeds have different frame rates, [m, n]=[kp, $\beta$q+$\alpha$], where k denotes the length ratio between the lengths of the reference lines, $\beta$ denotes the ratio between the frame rates of the video feeds, and $\alpha$ denotes a temporal offset between the video feeds. As before, the parameters $\beta$ and $\alpha$ are estimated in the parameter estimation stage, while the parameter k is either computed from the known ratio of the lengths of the reference lines or in the parameter estimation stage.

Block 16 in FIG. 1B, for example, describes an operation involving conducting foreground detection on the spatiotemporal maps to obtain foreground masks. Temporal differencing of video frames is often used to detect objects in motion, but often fails to detect slow-moving (relative to the video frame rate) or stationary objects. In these cases, background estimation and subtraction is often used. While background estimation can be performed in several ways, in this disclosure we focus on approaches that construct statistical models describing background pixel behavior.

According to this approach, a historical statistical model (e.g., a parametric density model such as a Gaussian Mixture Model (GMM) or a non-parametric density model such as a kernel-based estimate) for each pixel on the reference line can be constructed and updated continuously with each incoming frame at a rate controlled by a predetermined learning rate factor. Foreground detection can be performed by determining a measure of fit of each pixel value in the incoming frame relative to its constructed statistical model: pixels that do not fit their corresponding background model are considered foreground pixels.

To conduct foreground detection on the spatiotemporal maps, each column of the map is viewed as a frame. The first N (usually N~100) frames are used to initialize the background model. In this application, the choice of the learning rate is not as crucial as in regular foreground detection application because the two maps (e.g., one corresponding to each reference line), although obtained from two different cameras, vary at the same pace in terms of lighting, etc., and as such, the background models will take approximately the same time to converge.

Figure 4:
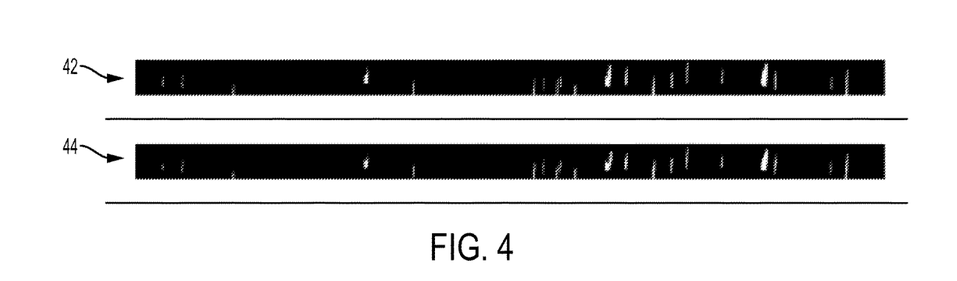
FIG. 4 illustrates foreground masks detected from the spatiotemporal maps, in accordance with an example embodiment.

Therefore, the two models trained on two different maps just need to share the same set parameter values (e.g., learning rate, number of components in the mixture, etc.) so that they react to foreground pixels in the same manner, regardless of whether they have converged or not. As a result, concerns such as the accuracy of the detection, or the speed of the motion (whether a foreground object that stays in the scene long enough to be absorbed into the background model or not), will not affect the following synchronization performance significantly since any false identification of foreground or background regions will likely occur on both models simultaneously. FIG. 4 illustrates foreground masks 42, 44 detected from the spatiotemporal maps, in accordance with an example embodiment. At the top of FIG. 4 is shown the spatiotemporal foreground mask 42 of the reference line in camera 1. The bottom of FIG. 4 depicts the spatiotemporal foreground mask 44 of the reference line in camera 2.

Block 18 of FIG. 1B, for example, depicts a step or operation of finding the optimal temporal alignment between video segments based on the registration of the foreground masks. In one embodiment, the registration of the foreground masks can be achieved by finding correspondences between the masks and estimating the parameters of the geometric transformation that best describes the relationship between the coordinates of the corresponding points, as described above. In an alternative embodiment, the number and configuration of foreground pixels that are detected at each frame (each column of the spatiotemporal map) can be used as a cue to align the two foreground masks along the temporal dimension, which effectively provides synchronization information between the cameras for which the maps were extracted.

Figure 5A:
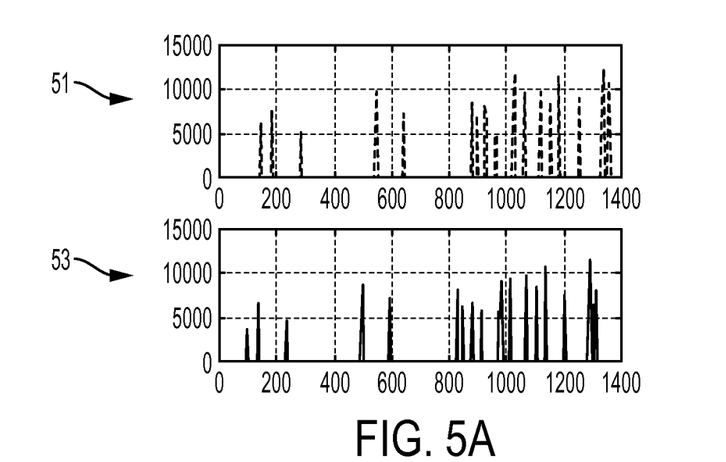
FIG. 5A illustrates graphs depicting data indicative of temporal sequences obtained from the projection of spatiotemporal masks along the spatial dimension resulting from foreground detection applied to spatiotemporal maps, in accordance with an example embodiment.

To that end, the values in the spatiotemporal foreground mask can be summed up or averaged along the spatial dimension in order to obtain temporal sequences. Specifically, let $f_1$[m, n] and $f_2$[p, q] denote the values of the spatiotemporal foreground masks of the reference lines in each of the cameras. Then $F_1[n]=k_1\Sigma_m f_1[m,n]$ and $F_2[q]=k_2\Sigma_p f_2[p,q]$, where $k_1$ and $k_2$ are constants inversely proportional to the lengths of their corresponding reference lines, and $F_1[n]$ and $F_2[q]$ are the temporal sequences that need to be aligned. An example of such temporal sequences resulting from the projection of the spatiotemporal foreground masks in FIG. 4 are illustrated in FIG. 5A. At the top of FIG. 5A, the projected binary sequence of the reference line in camera 1 is shown. At the bottom of FIG. 5A, the projected binary sequence of the reference line in camera 2 is depicted.

An example of such temporal sequences resulting from the projection of the spatiotemporal foreground masks is illustrated in FIG. 5A by graphs 51 and 53. The top graph 51 shown in FIG. 5A indicates the projected binary sequence of the reference line in camera 1. The bottom graph 53 depicted in FIG. 5A depicts the projected binary sequence of the reference line in camera 2.

Note that while the temporal sequences in FIG. 5A were obtained from the projection of spatiotemporal masks resulting from foreground detection applied to spatiotemporal maps, similar sequences can be obtained from projection of the spatiotemporal maps themselves. In the case of monochromatic spatiotemporal maps $g_1$[m, n] and $g_2$[p, q], projections are obtained as before by adding along the spatial dimension, namely $G_1[n]=k_1\Sigma_m g_1[m,n]$ and $G_2[q]=k_2\Sigma_p g_2[p,q]$. In the case of multi-color channel spatiotemporal maps $g_1[m, n, c]$ and $g_2[p, q, c]$, where c indexes the color channel, conversion to monochromatic maps can be performed before the projection via color space mapping techniques. Alternatively, different temporal sequences can be obtained, one for each color channel.

Once the temporal sequences are available, registration between the sequences can be achieved via techniques that achieve alignment between temporal sequences. In one embodiment, in the case where both video feeds have the same frame rate, inner products between the sequences $G_1[n]$ and $G_2[q+\alpha]$ for different values of $\alpha$ can be performed. The value of $\alpha$ for which the inner product (i.e., sum of element-wise products) between the sequences is largest represents the temporal offset between the video feeds. This approach is equivalent to computing the correlation between the sequences $G_1[n]$ and $G_2[q]$ and finding the offset for which correlation is largest.

In the case where the video feeds have different frame rates, inner products between the sequences $G_1[n]$ and $G_2[\beta q+\alpha]$ for different values of $\alpha$ and $\beta$ can be performed. The values of $\alpha$ and $\beta$ for which the product is largest are found; in this case, $\beta$ denotes the ratio between the frame rates of the video feeds, and $\alpha$ denotes a temporal offset between the video feeds, both of which can be used to synchronize the video feeds.

Figure 5B:
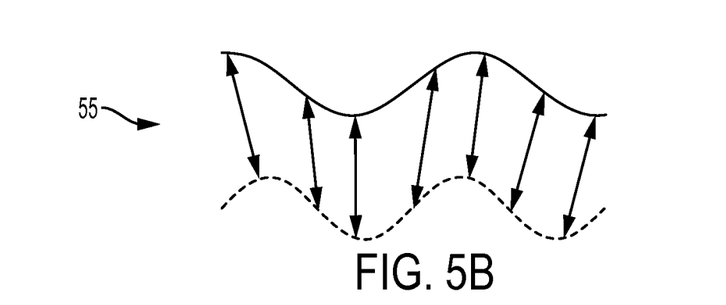
FIG. 5B illustrates a DTW (Dynamic Time Warping) configuration depicting local correspondences computed between two temporal sequences of potentially different shapes, in accordance with an example embodiment.

Note that the aforementioned temporal sequence registration techniques compute global registration parameters (namely $\alpha$ and $\beta$). Alternative techniques for registration of temporal sequences exist that compute local registration parameters. One such example is Dynamic Time Warping (DTW), which, as illustrated by the configuration 55 shown in FIG. 5B, computes local correspondences between two temporal sequences of potentially different shapes.

Figure 5C:
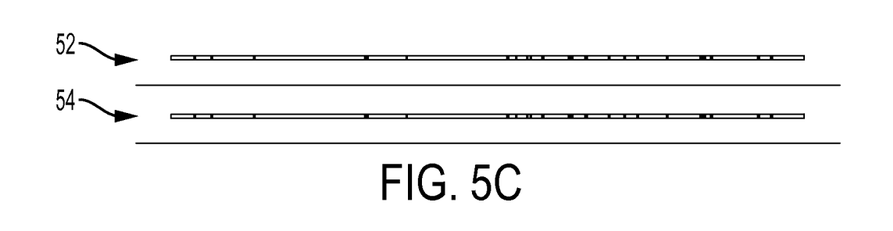
FIG. 5C illustrates the projected binary sequences of reference lines, in accordance with an example embodiment.

In yet another embodiment, the projected (along the spatial dimension) binary sequence that indicates the presence of foreground objects at each frame, should in most cases serve the purpose. Specifically, let $f_1[m, n]$ and $f_2[p, q]$ denote the values of the spatiotemporal foreground masks of the reference lines in each of the cameras. Then $F_1[n]=\max_m\{f_1[m, n]\}$ and $F_2[q]=\max_p\{f_2[p, q]\}$ where $\max_i\{f[i, j]\}$ denotes the largest value of $f[i, j]$ across the first dimension of $f[i, j]$ for any given value of j. An example of binarized sequences where one shade of color can indicate ON (e.g., foreground object in presence) and black, for example, can indicate OFF is shown in FIG. 5C. At the top of FIG. 5C, the projected binary sequence 52 of the reference line in camera 1 is shown. At the bottom of FIG. 5C, the projected binary sequence 54 of the reference line in camera 2 is depicted.

In this embodiment, the sequence alignment can be performed as follows: The incoming video streams can be partitioned into segments. An operation can be implemented to denote by $S_{a_1 a_M}^A$ a segment of length M in the sequence from camera A, whose frame indices are $a_i$ where $1 \le i \le M$. An operation can also be implemented to denote by $S_{a_1+i,a_M+i}^B$ a sequence of length M in the sequence from camera B whose frame indices are from $a_i+i$ to $a_M+i$, which corresponds to a shift by i from indices of $S_{a_1 a_M}^A$. Here, $-K \le i \le K$, where the variable K represents the maximum possible shift or search range in the optimization task. The shift that results in the best alignment is as follows:

$$i^* = \underset{i}{\mathrm{argmin}} \left\| S_{a_1 a_M}^A - S_{a_1+i,a_M+i}^B \right\|_1 \text{ for } -K \le i \le K$$

In special cases, for instance, where there are no foreground/background objects (e.g., the projected binary sequence will be all 0/1) in the segment, any shifting will give the same results. In this case, the optimal shift of the particular segment can be determined by linear interpolation from that of adjacent determined segments.

In the case where the two video sequences were recorded at different frame rates, either the videos can first be re-written to have the same frame rate before synchronization, or at the step or operations of blocks 14 or 16 of method 10 shown in FIG. 1B, simply the spatiotemporal map or foreground mask may be resized along the temporal dimension to a common length based on the known relationship between the video frame rates. In the special case where the frame rate is unknown (which happens very rarely), instead of aligning video segments of the same number of frames, the method will attempt to align video segments of the same duration in time, resize the spatiotemporal map of one of the cameras along the temporal dimension with different resize parameter in order to find the optimal alignment.

As can be appreciated by one skilled in the art, embodiments can be implemented in the context of a method, data processing system, or computer program product. Accordingly, embodiments may take the form of an entire hardware embodiment, an entire software embodiment or an embodiment combining software and hardware aspects all generally referred to herein as a "circuit" or "module." Furthermore, embodiments may in some cases take the form of a computer program product on a computer-usable storage medium having computer-usable program code embodied in the medium. Any suitable computer readable medium may be utilized including hard disks, USB Flash Drives, DVDs, CD-ROMs, optical storage devices, magnetic storage devices, server storage, databases, etc.

Computer program code for carrying out operations of the present invention may be written in an object oriented programming language (e.g., Java, C++, etc.). The computer program code, however, for carrying out operations of particular embodiments may also be written in conventional procedural programming languages, such as the "C" programming language or in a visually oriented programming environment, such as, for example, Visual Basic.

The program code may execute entirely on the user's computer, partly on the user's computer, as a stand-alone software package, partly on the user's computer and partly on a remote computer, or entirely on the remote computer. In the latter scenario, the remote computer may be connected to a user's computer through a local area network (LAN) or a wide area network (WAN), wireless data network, e.g., Wi-Fi, Wimax, 802.xx, and cellular network, or the connection may be made to an external computer via most third party supported networks (for example, through the Internet utilizing an Internet Service Provider).

The embodiments are described at least in part herein with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Figure 6:
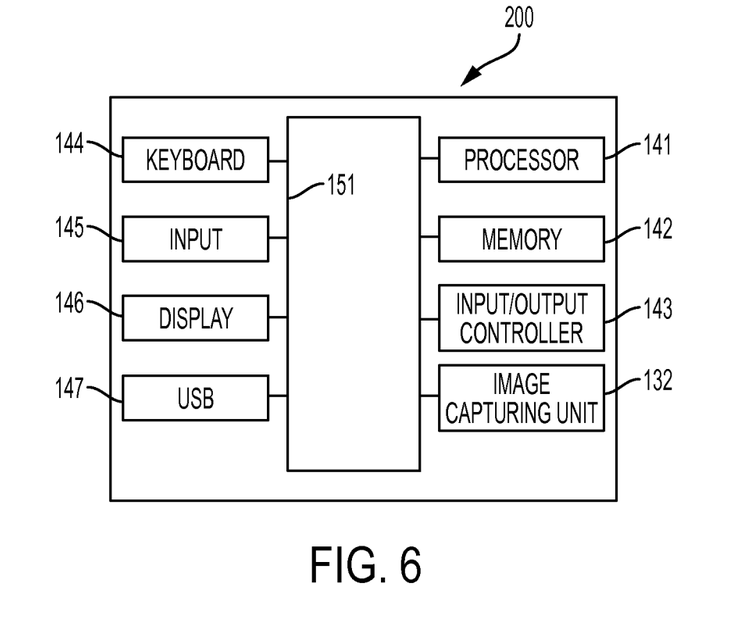
FIG. 6 illustrates a schematic view of a computer system, in accordance with an embodiment.
Figure 7:
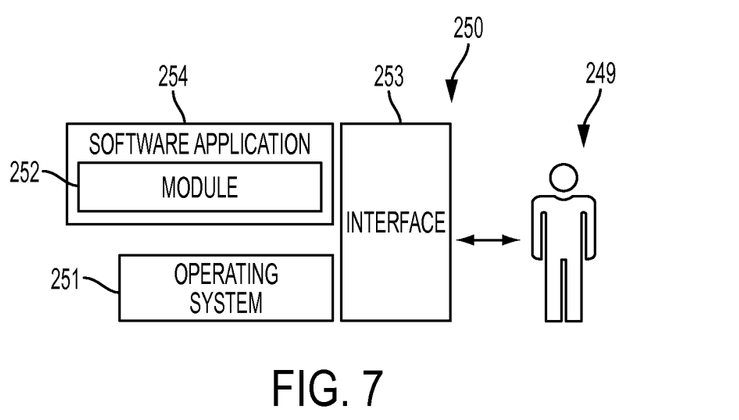
FIG. 7 illustrates a schematic view of a software system including a module, an operating system, and a user interface, in accordance with an embodiment.

FIGS. 6-7 are provided as exemplary diagrams of data-processing environments in which embodiments of the present invention may be implemented. It should be appreciated that FIGS. 6-7 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 6, some embodiments may be implemented in the context of a data-processing system 200 that includes, for example, a processor 141, a memory 142, an input/output controller 143, an image capturing unit or camera(s) 132, a keyboard 144, an input device 145 (e.g., a pointing device, such as a mouse, track ball, and pen device, etc.), a display 146, and a USB (Universal Serial Bus) peripheral connection 147. As illustrated, the various components of data-processing system 200 can communicate electronically through a system bus 151 or similar architecture. The system bus 151 may be, for example, a subsystem that transfers data between, for example, computer components within data-processing system 200 or to and from other data-processing devices, components, computers, etc. It can be appreciated that camera(s) 132 shown in FIG. 6 may be implemented as, for example, a single camera or a configuration of multiple cameras (e.g., two, three, four cameras, pairs of cameras, a multi-camera network, etc.), but is shown as a single block for illustrative purposes.

FIG. 7 illustrates a computer software system 250 for directing the operation of the data-processing system 200 depicted in FIG. 6. Software application 254, stored for example in memory 142, generally includes a kernel or operating system 251 and a shell or interface 253. One or more application programs, such as software application 254, may be "loaded" (i.e., transferred from, for example, a mass storage or other memory location into the memory 142) for execution by the data-processing system 200. The data-processing system 200 can receive user commands and data through an interface 253; these inputs may then be acted upon by the data-processing system 200 in accordance with instructions from operating system 251 and/or software application 254. The interface 253 in some embodiments can serve to display results, whereupon a user 249 may supply additional inputs or terminate a session. The software application 254 can include a module 252 that can be implemented with instructions such as, for example, those shown and described herein with respect to the various operations or steps shown in FIG. 1.

The following discussion is intended to provide a brief, general description of suitable computing environments in which the system and method may be implemented. Although not required, the disclosed embodiments will be described in the general context of computer-executable instructions, such as program modules, being executed by a single computer. In most instances, a "module" constitutes a software application.

Generally, program modules include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines; and an implementation, which is typically private (accessible only to that module) and which includes source code that actually implements the routines in the module. The term module may also simply refer to an application, such as a computer program designed to assist in the performance of a specific task, such as word processing, accounting, inventory management, etc. The module 252 shown in FIG. 7 can thus implement instructions such as those shown and described and illustrated herein.

FIGS. 6-7 are intended as examples and not as architectural limitations of disclosed embodiments. Additionally, such embodiments are not limited to any particular application or computing or data processing environment. Instead, those skilled in the art will appreciate that the disclosed approach may be advantageously applied to a variety of systems and application software. Moreover, the disclosed embodiments can be embodied on a variety of different computing platforms, including Macintosh, UNIX, LINUX, and the like.

The disclosed approach was implemented and tested on 1.5 hour-long videos recorded by two cameras with overlapping fields of view at a retail store near Chicago, Ill. The performance of the synchronization algorithm was measured in terms of the performance of a vehicle tracking/re-identification algorithm across the camera views, where the underlying assumption is that the surrogate performance numbers are indicative of the quality of the synchronization (i.e., the farther off the synchronization between the videos, the more often tracking and re-identification failures will occur).

Vehicles were detected in the first camera and handed off to the second camera and then tracked. Without applying the proposed automatic synchronization algorithm, the two videos, although manually synchronized at the beginning, started to get more and more out of sync later on, causing handoff errors between the two cameras. Within the 1.5 hour-long testing period, there are 261 cars that are supposed to be detected and tracked in total. Table 1 compares various types of errors with and without automatic video synchronization; the video sequence without automated synchronization was synchronized at the beginning of the video and never re-synchronized. It can be seen that with the use of automatic synchronization method, the number of handoff errors reduced significantly. In addition, the number of tracking errors in the second camera also reduced due to a better initialization of the trackers as a result of the improved handoff.

TABLE 1

| Auto Sync Correction | Without (Before) | With (After) |
|---|---|---|
| # of detection error in C1 | 6 | 6 |
| # of traction error in C1 | 11 | 11 |
| # of handoff error C1 to C2 | 85 | 5 |
| # of tracking error in C2 | 11 | 7 |
| # of total errors | 113 | 29 |
| Accuracy | 56.7% | 99.5% |

Figure 8:
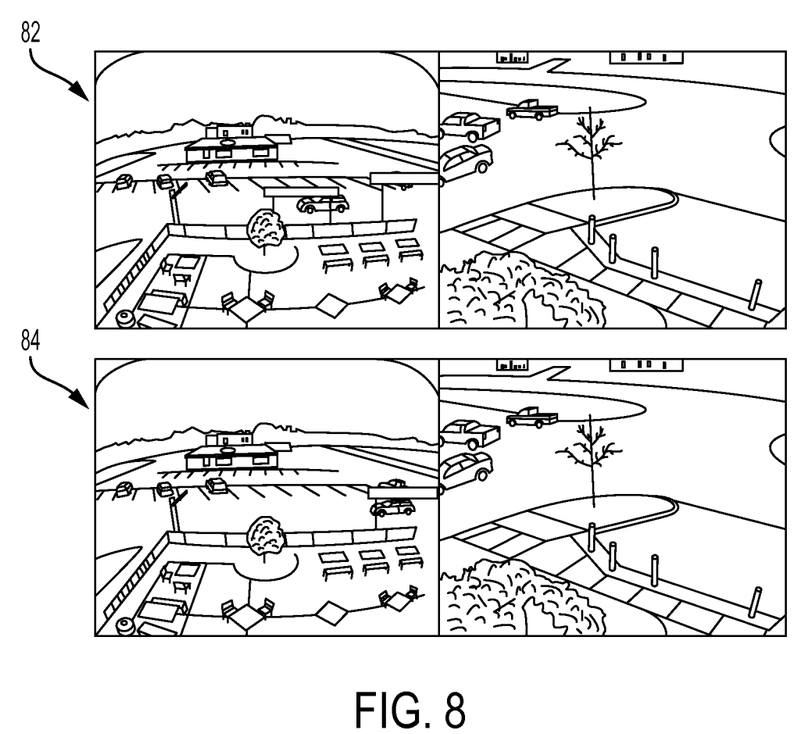
FIG. 8 illustrates a frame of two cameras without automatic synchronization, and a frame of the two cameras with automatic synchronization, in accordance with an experimental embodiment.

FIG. 8 illustrates a frame 82 of two cameras without automatic synchronization, and a frame 84 of the two cameras with automatic synchronization, in accordance with an experimental embodiment. To better visualize the effect of automatic synchronization, the video frames at frame index 31738 of the two cameras, which were well synchronized at frame index 1, are shown in FIG. 8. Notice that with the use of automatic synchronization, the car was handed off successfully from camera 1 to camera 2.

It can be appreciated that the disclosed embodiments provide for a continuous automated video synchronization for a process that is very labor-intensive when performed manually. The disclosed embodiments can be implemented as a method and/or system for automatically synchronizing videos acquired by cameras with overlapping views in a multi-camera network via processing in the spatiotemporal domain. The following steps or operations can be implemented: 1) Determine reference lines in both cameras within the overlapping field of view, the lines connecting two pairs of corresponding points; 2) Obtain spatiotemporal maps of reference lines; and 3) Find the optimal temporal alignment between video segments based on the registration of the resulting spatiotemporal maps.

In another embodiment, the disclosed techniques can be implemented as a method and/or system for automatically synchronizing videos acquired by cameras with overlapping views in a multi-camera network via foreground detection in the spatiotemporal domain. The following steps or operations can be implemented: 1) Determine reference lines in both cameras within the overlapping field of view, the lines connecting two pairs of corresponding points; 2) Obtain spatiotemporal maps of reference lines; 3) Conduct foreground detection on the spatiotemporal maps to obtain binary foreground masks; and 4) Find the optimal temporal alignment between video segments based on the registration of the resulting spatiotemporal maps.

The effectiveness and efficiency of the disclosed approach has been demonstrated on a video dataset acquired by a real-life camera network in a retail environment. Compared to the traditional (manual) synchronization approach, the proposed method is more accurate and more adaptive to synchronizing videos whose frame rates vary over time.

Advantages of the disclosed approach include, but are not limited to, automatic video synchronization (whereas most existing approaches are manual), and a more precise synchronization, which is accurate up to a frame (whereas manual synchronization based on observation is more error-prone). Additionally, the disclosed approach provides for the dynamic synchronization of various video segments with different synchronization parameters; whereas manual synchronization is usually with a fixed synchronization parameter upon determination, and is therefore less adaptive and more time consuming to re-adjust synchronization setting.

Based on the foregoing, it can be appreciated that a number of embodiments, preferred and alternative, are disclosed. For example, in one embodiment, a method can be implemented for automatically synchronizing videos acquired by two or more cameras with overlapping views in a multi-camera network. Such a method can include the steps or operations of determining reference lines within an overlapping field of view of the two (or more) cameras in the multi-camera network, the reference lines connecting at least two pairs of corresponding points; obtaining spatiotemporal maps of the reference lines; and determining an optimal alignment between video segments obtained from the two (or more) cameras based on a registration of the spatiotemporal maps.

In some embodiments, the registration of the spatiotemporal maps can involve extracting features from the spatiotemporal maps and finding correspondences between the extracted features. In another embodiment, a step or operation can be implemented for registering the spatiotemporal maps via at least one of an intensity-based registration technique and a feature-based registration technique. In still another embodiment, the registration of the spatiotemporal maps can involve dynamic time warping.

In yet another embodiment, the spatiotemporal maps can be registered by determining parameters of a geometric transformation that best maps one spatiotemporal map to the other among the spatiotemporal maps. Note that the geometric transformation may involve one or more of the following: rotation, scaling, translation, perspective, projective, and affine.

In still another embodiment, the spatiotemporal maps may be binary, the step or operation of obtaining the spatiotemporal maps can further involve steps or operations of performing a background estimation on the reference lines; and based on the background estimation and incoming frames, performing a foreground detection on each of the reference lines across a period of time to obtain a binary spatiotemporal map.

In yet another embodiment, the step or operation of registering the spatiotemporal maps can include projecting the spatiotemporal maps along a spatial dimension to obtain a temporal sequence, and registering a resulting temporal sequence via a temporal sequence registration technique. Note that the corresponding points can be automatically, manually or semi-automatically selected via feature extraction and matching between views among the two (or more) cameras. In yet another embodiment, the two (or more) cameras can record videos at different frame rates.

In another embodiment, a system for automatically synchronizing videos acquired by two or more cameras with overlapping views in a multi-camera network can be implemented. Such a system can include, for example, at least one processor and a non-transitory computer-usable medium embodying computer program code. The non-transitory computer-usable medium is capable of communicating with the processor(s). The computer program code can include instructions that are executable by the processor(s) and configured for: determining reference lines within an overlapping field of view of the two (or more) cameras in the multi-camera network, the reference lines connecting at least two pairs of corresponding points; obtaining spatiotemporal maps of the reference lines; and determining an optimal alignment between video segments obtained from the two (or more) cameras based on a registration of the spatiotemporal maps.

In another embodiment, a system for automatically synchronizing videos acquired from cameras having overlapping views in a multi-camera network can be implemented. Such a system can include two or more cameras in a multi-camera network, wherein reference lines within an overlapping field of view of the two (or more) cameras are identified, the reference lines connecting at least two pairs of corresponding points, and at least one processor for obtaining spatiotemporal maps of the reference lines and determining an optimal alignment between video segments obtained from the two (or more) cameras based on a registration of the spatiotemporal maps, wherein the processor(s) communicates with the two (or more) cameras.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art, which are also intended to be encompassed by the following claims.

The invention claimed is:

1. A method for automatically synchronizing videos acquired by at least two cameras with overlapping views in a multi-camera network, said method comprising:
   determining reference lines within an overlapping field of view of said at least two cameras in said multi-camera network, said reference lines connecting at least two pairs of corresponding points;
   obtaining spatiotemporal maps of said reference lines; and
   determining an optimal alignment between video segments obtained from said at least two cameras based on a registration of said spatiotemporal maps.

2. The method of claim 1 wherein said registration of said spatiotemporal maps comprises extracting features from said spatiotemporal maps and finding correspondences between the extracted features.

3. The method of claim 2 wherein said spatiotemporal maps are registered by determining parameters of a geometric transformation that best maps one spatiotemporal map to the other among said spatiotemporal maps according to the determined feature correspondences.

4. The method of claim 3 wherein said geometric transformation comprises at least one of: rotation, scaling, translation, perspective, projective, and affine.

5. The method of claim 1 further comprising registering said spatiotemporal maps via at least one of an intensity-based registration technique and a feature-based registration technique.

6. The method of claim 1 wherein said registration of said spatiotemporal maps comprises a dynamic time warping operation.

7. The method of claim 1 wherein said spatiotemporal maps are binary and wherein obtaining said spatiotemporal maps, further comprises:
   performing a background estimation on said reference lines; and
   based on said background estimation and incoming frames, performing a foreground detection on each of said reference lines across a period of time to obtain a binary spatiotemporal map.

8. The method of claim 1 wherein registering said spatiotemporal maps comprises:
   projecting said spatiotemporal maps along a spatial dimension to obtain a temporal sequence, and
   registering a resulting temporal sequence via a temporal sequence registration technique.

9. The method of claim 1 wherein corresponding points are automatically, manually or semi-automatically selected via feature extraction and matching between views among said at least two cameras.

10. The method of claim 1 wherein said at least two videos have different frame rates or wherein a temporal offset exists between said at least two videos.

11. A system for automatically synchronizing videos acquired by at least two cameras with overlapping views in a multi-camera network, said system comprising:
   at least one processor; and
   a computer-usable medium embodying computer program code, said computer-usable medium capable of communicating with said at least one processor, said computer program code comprising instructions executable by said at least one processor and configured for:
      determining reference lines within an overlapping field of view of said at least two cameras in said multi-camera network, said reference lines connecting at least two pairs of corresponding points;
      obtaining spatiotemporal maps of said reference lines; and
      determining an optimal alignment between video segments obtained from said at least two cameras based on a registration of said spatiotemporal maps.

12. The system of claim 11 wherein said registration of said spatiotemporal maps comprises extracting features from said spatiotemporal maps and finding correspondences between the extracted features.

13. The system of claim 11 wherein said instructions are further configured for registering said spatiotemporal maps via at least one of an intensity-based registration technique and a feature-based registration technique.

14. The system of claim 11 wherein said registration of said spatiotemporal maps comprises a dynamic time warping operation.

15. The system of claim 11 wherein said spatiotemporal maps are registered by determining parameters of a geometric transformation that best maps one spatiotemporal map to the other among said spatiotemporal maps and wherein said geometric transformation comprises at least one of: rotation, scaling, translation, perspective, projective, and affine.

16. The system of claim 11 wherein said spatiotemporal maps are binary and wherein said instructions for obtaining said spatiotemporal maps, further comprise instructions configured for:
   performing a background estimation on said reference lines; and
   based on said background estimation and incoming frames, performing a foreground detection on each of said reference lines across a period of time to obtain a binary spatiotemporal map.

17. The system of claim 11 wherein registering said spatiotemporal maps comprises:
   projecting said spatiotemporal maps along a spatial dimension to obtain a temporal sequence; and
   registering a resulting temporal sequence via a temporal sequence registration technique.

18. The system of claim 11 wherein corresponding points are automatically, manually or semi-automatically selected via feature extraction and matching between views among said at least two cameras.

19. The system of claim 11 wherein said at least two videos have different frame rates or wherein a temporal offset exists between said at least two videos.

20. A system for automatically synchronizing videos acquired from cameras having overlapping views in a multi-camera network, said system comprising:
- at least two cameras in a multi-camera network, wherein reference lines within an overlapping field of view of said at least two cameras are identified, said reference lines connecting at least two pairs of corresponding points; and
- at least one processor for obtaining spatiotemporal maps of said reference lines and determining an optimal alignment between video segments obtained from said at least two cameras based on a registration of said spatiotemporal maps, wherein said at least one processor communicates with said at least two cameras.

* * * * *